UNITED STATES PATENT OFFICE.

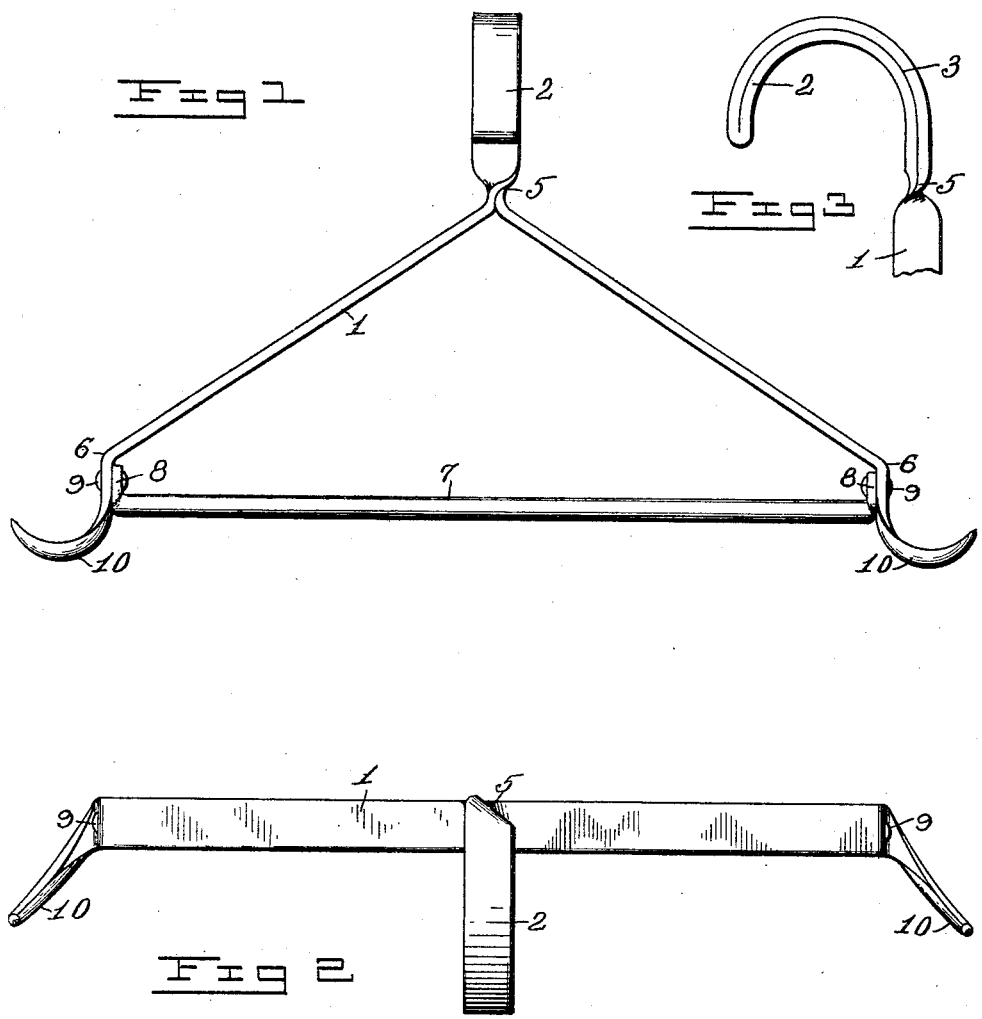

CLARENCE GUY COULTAS, OF MURRAYVILLE, ILLINOIS.

HOG-GAMBREL.

940,434.  Specification of Letters Patent.  Patented Nov. 16, 1909.

Application filed January 5, 1909. Serial No. 470,772.

*To all whom it may concern:*

Be it known that I, CLARENCE GUY COULTAS, a citizen of the United States, residing at Murrayville, in the county of Morgan and State of Illinois, have invented certain new and useful Improvements in Hog-Gambrels, of which the following is a specification.

My invention relates to improvements in devices for butchering hogs, or analogous uses and it consists in the constructions and combinations herein described and claimed.

The gambrel in most common use consists merely of a straight stick pointed at each end. The hind legs of the animal are held apart and suspended by means of this stick, but the disadvantages arising from its uses are many, and it is the purpose of the present invention to obviate these objections by providing a device which will permit of suspending an animal, when butchering, with greater facility and in such a manner that the work can be carried on with convenience and despatch.

A further object of my invention is to provide a device which is simple in construction, durable and of comparatively little cost.

Other objects and advantages will appear in the following specification, and the novel features of the device will be particularly pointed out in the appended claims.

My invention is illustrated in the accompanying drawings, in which,

Figure 1 is a side view showing one embodiment of the invention. Fig. 2 is a plan view of the device, and Fig. 3 is a detail view of the suspending hook.

In carrying out my invention I take a bar of strap iron 1, preferably 36 inches in length, and round and point the ends. These ends are then bent into hooks 10. The central part of the bar is bent back upon itself and is curved to form a hook 2 as shown in Fig. 3. The adjacent parts are then welded together along their contacting surfaces 3. The bar is then twisted at 5, the free outer portions being spread apart as shown in Fig. 1. The bars are bent again at 6 and the hooks 10 at each end are bent out of the plane of the arms 1, at an angle approximately 45°, as shown in Fig. 2. A cross bar 7, having the upturned ends 8 is secured by rivets 9 between the ends of the diverging arms 1 at the base of the hooks 10.

From the foregoing description of the various parts of the device the use and advantages thereof may be readily understood. It will be observed that the inclination of the hooks 10, brings them at the proper angle for entering between the tendons and the bones, since when the legs of the animal are forced apart the plane of the bone and its tendon is not at right angles to the bar 7 but approximately at an angle of 45°. In butchering a hog or other animal, the hind legs of the animal are held apart and the hooks 10 are caught in openings made between the tendons and bone of each leg, and by means of the large hook 2 is then suspended from a rail or convenient limb of a tree. If desired the large hook 2 can be made to lie in the plane with the arms 1, and the cross bar 7.

From the foregoing description it will be seen that the device is of very simple construction. The hook 2 which bears the whole weight of the animal has a double thickness of metal. The triangular shape of the gambrel gives the greatest strength and the rod 7 prevents any sagging of the support.

Obviously other animals such as sheep or small calves may be conveniently butchered on my improved gambrel.

What I claim and desire to secure by Letters Patent of the United States, is—

As an article of manufacture, a gambrel comprising a triangular frame having an upper central suspending hook at one corner thereof, and an engaging hook at each of the other corners, said engaging hooks being bent out of the plane of said frame at an angle of from 35 to 45 degrees, whereby said engaging hooks are brought to a convenient angle for entering between the tendons and bones of the legs of an animal when forced apart to apply said gambrel.

In testimony whereof I affix my signature in presence of two witnesses.

CLARENCE GUY COULTAS.

Witnesses:
WILLIAM KASTRUP,
WILLIAM E. THOMSON.